Aug. 2, 1960

J. F. TRACY 2,947,927

ELECTRIC CAPACITOR AND DIELECTRIC MATERIAL THEREFOR

Filed Dec. 22, 1958

Inventor,
James F. Tracy,
by Gilbert P. Tarleton
His Attorney.

United States Patent Office 2,947,927
Patented Aug. 2, 1960

2,947,927

ELECTRIC CAPACITOR AND DIELECTRIC MATERIAL THEREFOR

James F. Tracy, Fort Edward, N.Y., assignor to General Electric Company, a corporation of New York Filed Dec. 22, 1958, Ser. No. 782,146

3 Claims. (Cl. 317—258)

The present invention relates to electric capacitors, and especially those adapted to operate in high frequency circuits. More particularly, the invention concerns an improved dielectric material for use in such capacitors.

It is an object of the invention to provide capacitors which are adapted for operation at high frequencies and which have electrical and physical properties under such conditions which are superior to conventional capacitors of this type, and which are yet more economical to produce.

I have discovered that liquid adipic acid esters, and particularly di iso butyl adipate, are eminently well suited for use as dielectric materials for high frequency capacitors and provide marked improvement in various electrical and physical properties over dielectric liquids heretofore used for such purposes.

Figure 2:
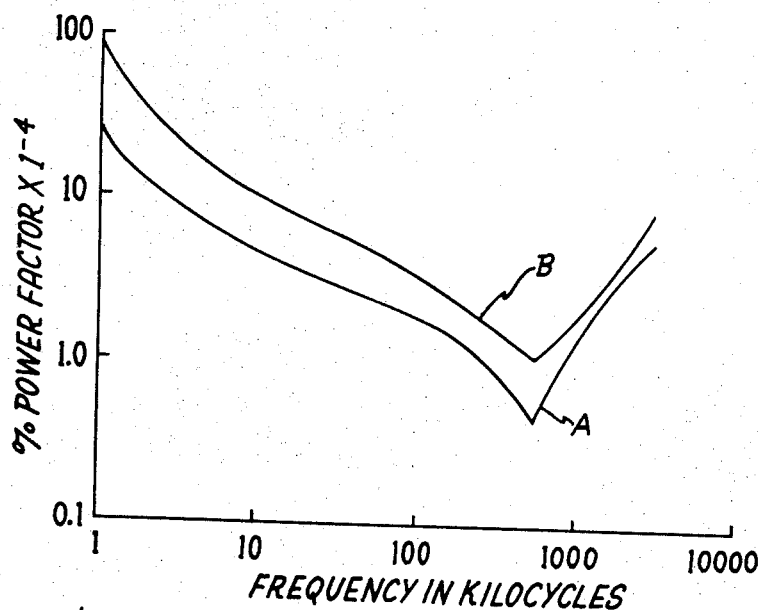
Figure 3:
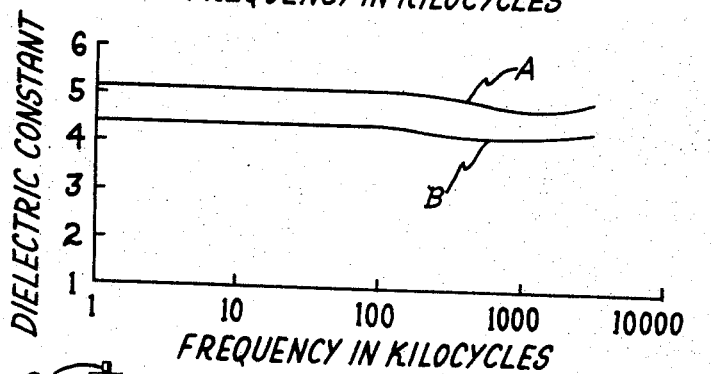
Figure 1:
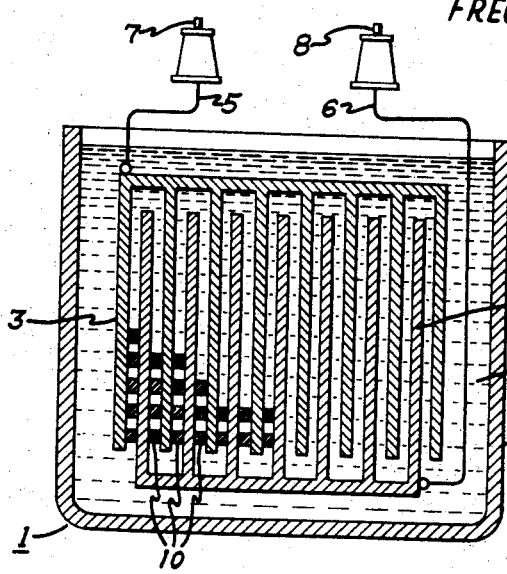

The invention will be better understood from the following description taken in conjunction with the accompanying drawing, in which:

Fig. 1 shows in section a capacitor in which the present invention may be embodied;

Fig. 2 graphically illustrates the improvement of the present dielectric liquid over a prior art material in power factor characteristics with varying frequency; and Fig. 3 graphically illustrates a similar comparison in terms of dielectric constant vs. frequency.

Referring now to the drawing, and particularly to Fig. 1, there is shown in conventional form a high frequency capacitor 1, in which the dielectric liquid of the present invention may be advantageously employed. Capacitor 1 comprises a tank 2 in which are contained spaced parallel plate armatures 3, 4 of opposite polarity. Suitable spacers 10 of porous insulating material, such as paper, glass fibers, cheesecloth, mineral particles, or the equivalent, may be used if desired between plates 3 and 4. Armatures 3, 4 are respectively connected by conductors 5, 6 to bushing terminals 7, 8 and are immersed in dielectric liquid 9, which in accordance with the invention is preferably composed of di iso butyl adipate.

The di iso butyl adipate not only has many of the favorable properties characterizing other dielectric liquids, especially di butyl sebacate, which have previously been found satisfactory for use as high frequency dielectrics, but also has several important advantages over the known dielectric liquids for such application. For example, di iso butyl adipate has been found to have a dielectric constant of 5.2, which constitutes a 22% improvement over the dielectric constant of 4.27 of di butyl sebacate. When compared with the 2.1 dielectric constant of mineral oil which is another commonly used high frequency dielectric, the increase provided is better than 140%. This feature of the present dielectric liquid makes it possible to provide capacitors having greater capacitance than those of conventional type without increasing their size, or having reduced size without sacrifice in electrical capacity.

Dielectric strengths of between 30–40 kv. A.C. at 60 cycles and 25° C. have been obtained with di iso butyl adipate, results which are indicative of excellent insulating properties. Moreover, di iso butyl adipate exhibits a pour point of about −28° C. which is approximately 18° C. lower than that obtained with di butyl sebacate.

Di iso butyl adipate also is a more mobile liquid than di butyl sebacate, mineral oil or castor oil, having a Saybolt Universal seconds viscosity at 37.8° C. of about 37 seconds, as against about 46 seconds for di butyl sebacate, 100 seconds for mineral oil, and 100 seconds for castor oil at 100° C. Prior observations in the art have led to an empirical rule that, for practical use, a suitable high frequency dielectric should have a Saybolt Universal seconds visocity at 37.8° C. of less than 100 seconds in order to encounter minimal dielectric losses. The lower the viscosity of the dielectric liquid, the lower are the frictional losses.

When compared to castor oil, which has a power factor of between 2 and 5% in the range of 1 to 1000 kilocycles and to mineral oil with a power factor of between 0.5 and 1.0% over the same frequency range, di iso butyl adipate provides a vast improvement in power factor with a spread of 0.003–0.00005% over the same frequency range. The latter material also provides an improvement in this respect, although of lesser degree, over di butyl sebacate, as hereinafter described.

An especially noteworthy and unexpected improvement afforded in high frequency capacitors by the present di iso butyl adipate dielectric material resides in the absence of gassing in the latter under high frequency conditions. This is in contrast to the considerable gassing frequently observed in capacitors incorporating di butyl sebacate, a characteristic which adversely affects the electrical properties of the capacitor and causes excessive internal pressures in the capacitor casing. It is also because of such gassing characteristics under high frequency conditions that makes it undesirable to use chlorinated diphenyl dielectric compositions for such applications, although such compositions have proved to be excellent dielectric materials under other conditions.

In comparative tests made with two capacitor units, one containing di iso butyl adipate and the other di butyl sebacate, the units were subjected to an electrical stress of 20 kva. at a frequency of 1 megacycle. After one hour, the di butyl sebacate capacitor developed a heat rise of 40° C. and the case became distended due to gassing of the liquid. Under the same stress, the di iso butyl adipate capacitor after eight hours showed a heat rise of only 7° C. and no distention of the case occurred. I have found in general that at frequencies between 550 kc. and 1 mc. and at electrical stresses normally encountered in operation, viz., 25–55 volts per mil, the di iso butyl adipate will not gas, although di butyl sebacate under the same conditions will frequently do so.

Comparative tests have also indicated that the power factor of capacitors with di iso butyl adipate dielectric is not only lower than that of capacitors with di butyl sebacate, but also does not increase as rapidly with an increasing temperature as the di butyl sebacate units.

Fig. 2 shows a graph in logarithmic scale of percent power factor plotted against frequency, showing a comparison of the two dielectric liquids, di iso butyl adipate (curve A) and di butyl sebacate (curve B), in this respect. As is evident from the graph, di iso butyl adipate exhibits a substantially lower power factor than di butyl sebacate over the entire frequency range of 1 to 3000 kc.

Fig. 3 shows the relationship between the two above dielectric materials in terms of dielectric constant plotted against frequency in logarithmic scale, curve A being di iso butyl adipate and curve B being di butyl sebacate. While the dielectric constant of both materials has only negligible variation over the range of 1 to 3000 kc. frequency, di iso butyl adipate remains substantially higher in dielectric constant over the entire frequency range tested.

Not the least benefit provided by the use of di iso butyl adipate is the fact that its cost is about two-thirds that of di butyl sebacate, thus contributing a major factor in the production of more economical high frequency capacitors.

By way of summary, the properties of di iso butyl adipate are as follows:

| | |
|---|---|
| Refractive index $N_D^{25°}$ | 1.4318 |
| Viscosity, S.U.S., at 37.8° C. | 37 |
| Pour point, ° C. | −28 |
| Molecular weight | 258 |
| Flash point, ° C., C.O.C. | 160 |
| Dielectric constant, 1 mc., 25° C. | 5.25 |

While di iso butyl adipate appears to have optimum properties for the purpose of the invention, the isomers of this material, di n-butyl adipate and di sec-butyl adipate, as well as other adipic acid esters exhibit similar properties and may be satisfactorily used as high frequency dielectric liquids in accordance with the invention. The properties of the isomers of di iso butyl adipate were found to be practically the same as those listed above for the latter material except for dielectric constant which was 4.67. Additional adipic acid esters found suitable include di hexyl adipate, di-2-ethyl hexyl adipate, di butoxy ethyl adipate, and di-2-ethyl butyl adipate. For example, di butyoxy ethyl adipate exhibits a dielectric constant of 6.25 at 1 kc. and 25° C. and a percent power factor of 0.0006 at 1 mc. and 25° C. Its pour point is −34° C., which is even lower than that of di iso butyl adipate. Di-2-ethyl hexyl adipate with a dielectric constant of 4.14 at 1 kc. has a power factor of .0002 at 550 kc. and an exceptionally low pour point of −75° C. Di hexyl adipate has a dielectric constant of 4.31 at 1 mc., a power factor of .00045 at 1 mc., and a pour point of −8° C.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electric capacitor comprising a container, spaced armatures in said container, and a liquid dielectric material in said container between said armatures consisting essentially of adipic acid ester material.

2. An electric capacitor for high frequency circuits comprising a container, spaced armatures in said container, and a liquid dielectric material in said container between said spaced armatures consisting essentially of an adipic acid ester selected from the group consisting of di iso butyl adipate and isomers thereof, di-hexyl adipate di-2-ethyl hexyl adipate, di butoxy ethyl adipate, and di-2-ethyl butyl adipate, and mixtures thereof.

3. An electric capacitor for high frequency circuits comprising a container, spaced armatures in said container, and a liquid dielectric material in said container between said spaced armatures consisting essentially of di iso butyl adipate.

References Cited in the file of this patent

UNITED STATES PATENTS

| | | |
|---|---|---|
| 2,019,336 | Clark | Oct. 29, 1935 |
| 2,414,399 | Sorg | Jan. 14, 1947 |
| 2,421,241 | Clark | May 27, 1947 |
| 2,475,310 | Clark | July 5, 1949 |
| 2,475,592 | Clark | July 12, 1949 |
| 2,550,452 | Byrne et al. | Apr. 24, 1951 |
| 2,757,262 | Yeamans | July 31, 1956 |